US012762197B2

(12) United States Patent
Twig et al.

(10) Patent No.: US 12,762,197 B2
(45) Date of Patent: Oct. 13, 2026

(54) MULTI-SECTIONAL USER INTERFACES FOR LLM-INTEGRATED PARAMETER SELECTION FOR SEARCHES

(71) Applicant: Navan, Inc., Palo Alto, CA (US)

(72) Inventors: Ilan Ezra Twig, San Francisco, CA (US); Oleg Solop, Boca Raton, FL (US); Eyal Ophir, Mountain View, CA (US)

(73) Assignee: Navan, Inc., Palo Alto, CA (US)

( * ) Notice: Subject to any disclaimer, the term of this patent is extended or adjusted under 35 U.S.C. 154(b) by 0 days.

(21) Appl. No.: 18/895,222

(22) Filed: Sep. 24, 2024

(65) Prior Publication Data

US 2025/0103668 A1 Mar. 27, 2025

Related U.S. Application Data

(60) Provisional application No. 63/585,158, filed on Sep. 25, 2023.

(51) Int. Cl.
*G06F 16/00* (2019.01)
*G06F 16/954* (2019.01)

(52) U.S. Cl.
CPC .................................. *G06F 16/954* (2019.01)

(58) Field of Classification Search
None
See application file for complete search history.

(56) References Cited

U.S. PATENT DOCUMENTS 11,055,305 B1 7/2021 Petricek et al.
12,511,679 B2 * 12/2025 Batina ..................... G06F 40/40
2013/0275164 A1 * 10/2013 Gruber ................ G06F 16/2457 705/5
2018/0025085 A1 1/2018 Sarangi et al.
2019/0050494 A1 * 2/2019 Rao ....................... G06F 16/435
2019/0278844 A1 * 9/2019 Brixey .................. G06F 40/169
2020/0312298 A1 * 10/2020 Bui ......................... G06F 3/167
2021/0382922 A1 * 12/2021 Guo ........................ G06F 16/53
2022/0222083 A1 * 7/2022 Tabb ........................ G06F 30/20
2022/0309628 A1 * 9/2022 Fujita .................... G06F 40/268
2023/0274089 A1 8/2023 Tunstall-Pedoe et al.
2023/0368268 A1 * 11/2023 Wang ................ G06Q 30/0631

(Continued)

OTHER PUBLICATIONS

PCT International Search Report and Written Opinion, PCT Application No. PCT/US2024/048237, Dec. 6, 2024, 14 pages.

*Primary Examiner* — Polina G Peach
(74) *Attorney, Agent, or Firm* — Fenwick & West LLP

(57) ABSTRACT

An online system provides a search user interface to users whereby users may search for content through elements in a primary section or through a chat section that interfaces with an automated chat system. The primary section of the search user interface displays the content that the user is searching for and includes user interface elements for setting parameters for the search for content. The chat section includes user interface elements for a chat session between the user and an automated chat system. The search user interface allows the user to set parameters for a search through both the primary section and the chat section of the search user interface. For example, the user may use the parameters elements in the primary section to set quantifiable search parameters while using the chat section to set more subjective search parameters.

16 Claims, 5 Drawing Sheets

(56) References Cited

U.S. PATENT DOCUMENTS

| | | | | |
|---|---|---|---|---|
| 2024/0020538 | A1* | 1/2024 | Socher | G06N 3/084 |
| 2024/0127070 | A1 | 4/2024 | Gao et al. | |
| 2024/0289361 | A1* | 8/2024 | Batina | G06F 16/3328 |
| 2024/0312087 | A1* | 9/2024 | Agrawal | G06F 40/186 |
| 2024/0338378 | A1* | 10/2024 | Setlur | G06F 16/243 |
| 2024/0354309 | A1* | 10/2024 | Sacheti | G06F 16/2455 |
| 2024/0428091 | A1* | 12/2024 | Sharpe | G06N 5/025 |
| 2025/0086397 | A1* | 3/2025 | Conort | G06F 16/2456 |
| 2025/0086865 | A1* | 3/2025 | Menges | G06T 11/10 |
| 2025/0094471 | A1* | 3/2025 | Brenna | G06F 16/345 |
| 2025/0094703 | A1* | 3/2025 | Malak | G06F 40/20 |

* cited by examiner

MULTI-SECTIONAL USER INTERFACES FOR LLM-INTEGRATED PARAMETER SELECTION FOR SEARCHES

BACKGROUND

This application claims the benefit of U.S. Provisional Application No. 63/585,158, entitled "Integrating Chatbot and Main Content Interface using Large Language Models" and filed Sep. 25, 2023, which is incorporated by reference.

BACKGROUND

Online systems allow users to search for and interact with content that these systems make available. Users searching for content utilize user interfaces provided by the online systems to select parameters for searches. For example, a user searching for images may use user interface elements corresponding to different search parameters to set the parameters for which images they are searching for. Commonly, these user interfaces are optimized for users to provide structured information for search parameters. For example, the user interfaces may include elements by which users can set explicit values for search parameters.

While these techniques are effective for searching for content using easily quantifiable parameters, they are less effective for parameters that are less quantifiable, such as a topic or quality of content. While humans may understand how to evaluate these more-subjective parameters using their own intuition, computer systems lack this subjective understanding of content and require structured data on which to perform operations. Therefore, computer systems remain ineffective as identifying content that a user is searching for.

SUMMARY

An online system provides a search user interface to users whereby users may search for content through elements in a primary section of the search user interface or through a chat section of the search user interface that interfaces with an automated chat system. The primary section of the search user interface displays the content that the user is searching for and includes user interface elements for setting parameters for the search for content. The chat section includes user interface elements for a chat session between the user and an automated chat system. The search user interface allows the user to set parameters for a search through both the primary section and the chat section of the search user interface. For example, the user may use the parameters elements in the primary section to set quantifiable search parameters while using the chat section to set more subjective search parameters.

The online system maintains a parameter data structure that stores the parameters that the user has set for the search. The parameter data structure may store the values for parameters that the user has set and may be updated whenever the user sets new parameters through the primary section or the chat section of the search user interface. The online system uses the parameter data structure to search for content and to update the search user interface. For example, the online system may use the parameters stored in the parameter data structure to select content to present to the user through the primary user interface or to select a page or format of the primary user interface. The online system may continually update the search user interface based on the parameter data structure as the parameter data structure is updated.

The online system uses a large-language model (LLM) to extract parameters from the messages that the user provides through the chat section of the user interface. The online system prompts the LLM to extract parameters from messages that the user provides through the chat section. The LLM prompts may identify which parameters the LLM should extract from user messages or may include the parameter data structure to guide the LLM in identifying parameters in the user messages. The LLM prompts may also include instructions on how the LLM should structure the parameters in the responses generated by the LLM or may include instructions to generate a chat response to the user's message to be included in the chat section of the search user interface.

By maintaining a parameter data structure that stores parameters set by the user through the chat section or the primary section of the search user interface, the online system can integrate parameters received through the chat section using an LLM with the more-easily quantifiable parameters received through the primary section. Thus, the online system can better use parameters to surface search results that are useful to a user.

DETAILED DESCRIPTION

System Environment

Figure 1:
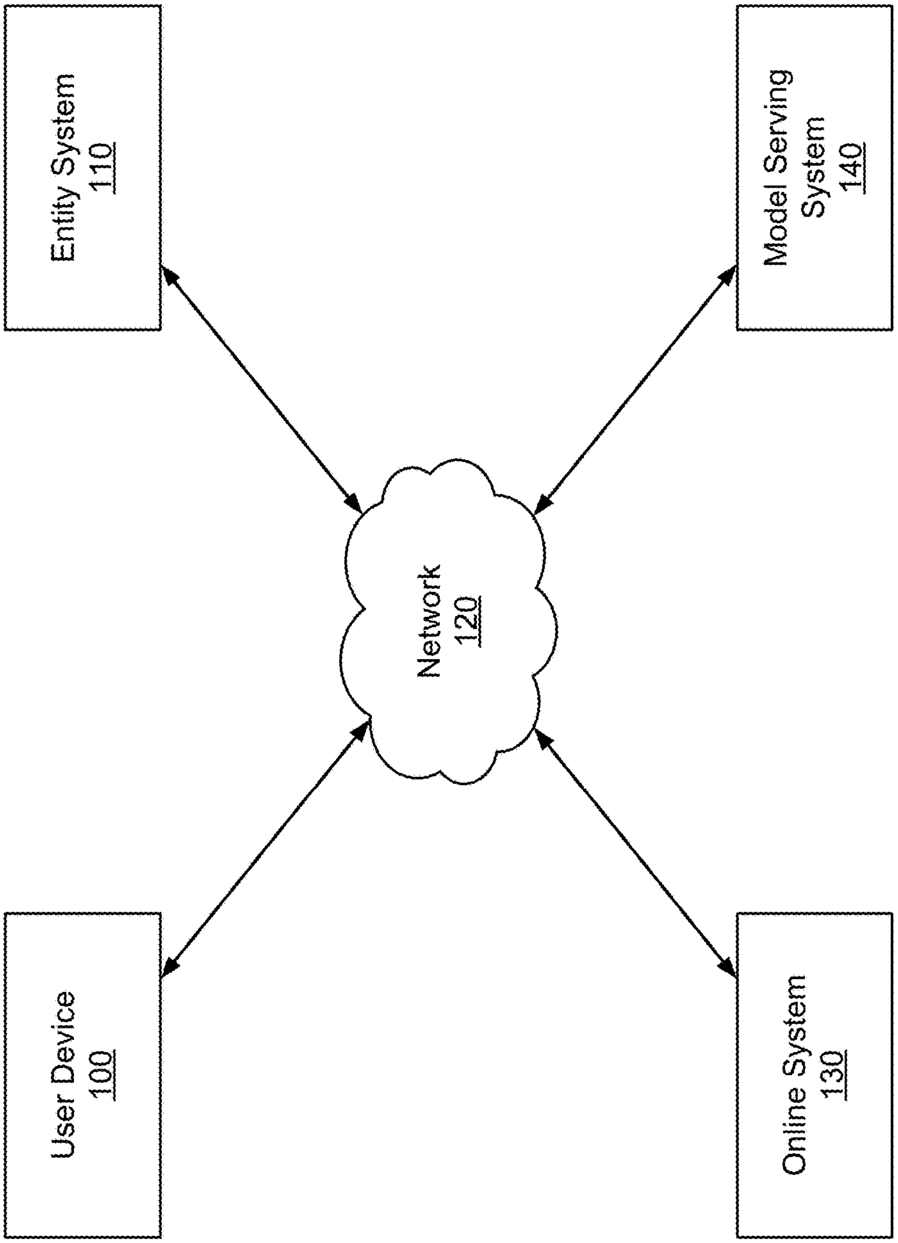
FIG. 1 illustrates an example system environment for an online system, in accordance with some embodiments.

FIG. 1 illustrates an example system environment for an online system 130, in accordance with some embodiments. The system environment illustrated in FIG. 1 includes a user device 100, an entity system 110, a network 120, an online system 130, and a model serving system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

A user can interact with other systems through a user device 100. The user device 100 can be a personal or mobile computing device, such as a smartphone, a tablet, a laptop computer, or desktop computer. In some embodiments, the user device 100 executes a client application that uses an application programming interface (API) to communicate with other systems through the network 120.

The entity system 110 is a computing system operated by an entity. The entity may be a business, organization, or government, and the user may be an agent or employee of the entity.

The network 120 is a collection of computing devices that communicate via wired or wireless connections. The network 120 may include one or more local area networks (LANs) or one or more wide area networks (WANs). The network 120, as referred to herein, is an inclusive term that may refer to any or all of standard layers used to describe a physical or virtual network, such as the physical layer, the data link layer, the network layer, the transport layer, the session layer, the presentation layer, and the application layer. The network 120 may include physical media for communicating data from one computing device to another computing device, such as MPLS lines, fiber optic cables, cellular connections (e.g., 3G, 4G, or 5G spectra), or satellites. The network 120 also may use networking protocols, such as TCP/IP, HTTP, SSH, SMS, or FTP, to transmit data between computing devices. In some embodiments, the network 120 may include Bluetooth or near-field communication (NFC) technologies or protocols for local communications between computing devices. Similarly, the network 120 may use phone lines for communications. The network 120 may transmit encrypted or unencrypted data.

The online system provides a search user interface to users whereby users may search for content through elements in a primary section or through a chat section that interfaces with an automated chat system. The primary section of the search user interface displays the content that the user is searching for and includes user interface elements for setting parameters for the search for content. The chat section includes user interface elements for a chat session between the user and an automated chat system. The search user interface allows the user to set parameters for a search through both the primary section and the chat section of the search user interface. For example, the user may use the parameters elements in the primary section to set quantifiable search parameters while using the chat section to set more subjective search parameters. The functionality of the online system is described in further detail below.

The model serving system 140 receives requests from other systems to perform tasks using machine-learned models. The tasks include, but are not limited to, natural language processing (NLP) tasks, audio processing tasks, image processing tasks, video processing tasks, and the like. In one embodiment, the machine-learned models deployed by the model serving system 140 are models configured to perform one or more NLP tasks. The NLP tasks include, but are not limited to, text generation, query processing, machine translation, chatbots, and the like. In one embodiment, the language model is configured as a transformer neural network architecture. Specifically, the transformer model is coupled to receive sequential data tokenized into a sequence of input tokens and generates a sequence of output tokens depending on the task to be performed.

The model serving system 140 receives a request including input data (e.g., text data, audio data, image data, or video data) and encodes the input data into a set of input tokens. The model serving system 140 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens may be arranged as a tensor with one or more dimensions, for example, one dimension, two dimensions, or three dimensions. In an example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one embodiment, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 130 or one or more entities different from the online system 130. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one embodiment, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

While the model serving system 140 is depicted as separate from the online system 130 in FIG. 1, in alternative embodiments, the model serving system 140 is a component of the online system 130.

Though the system can be applied in many environments, in one example, the online system 130 is an expense management system. An expense management system is a computing system that manages expenses incurred for an entity by users. An example system is described in further detail in U.S. patent application Ser. No. 18/487,821 filed Oct. 16, 2023, which is incorporated by reference.

Figure 2:
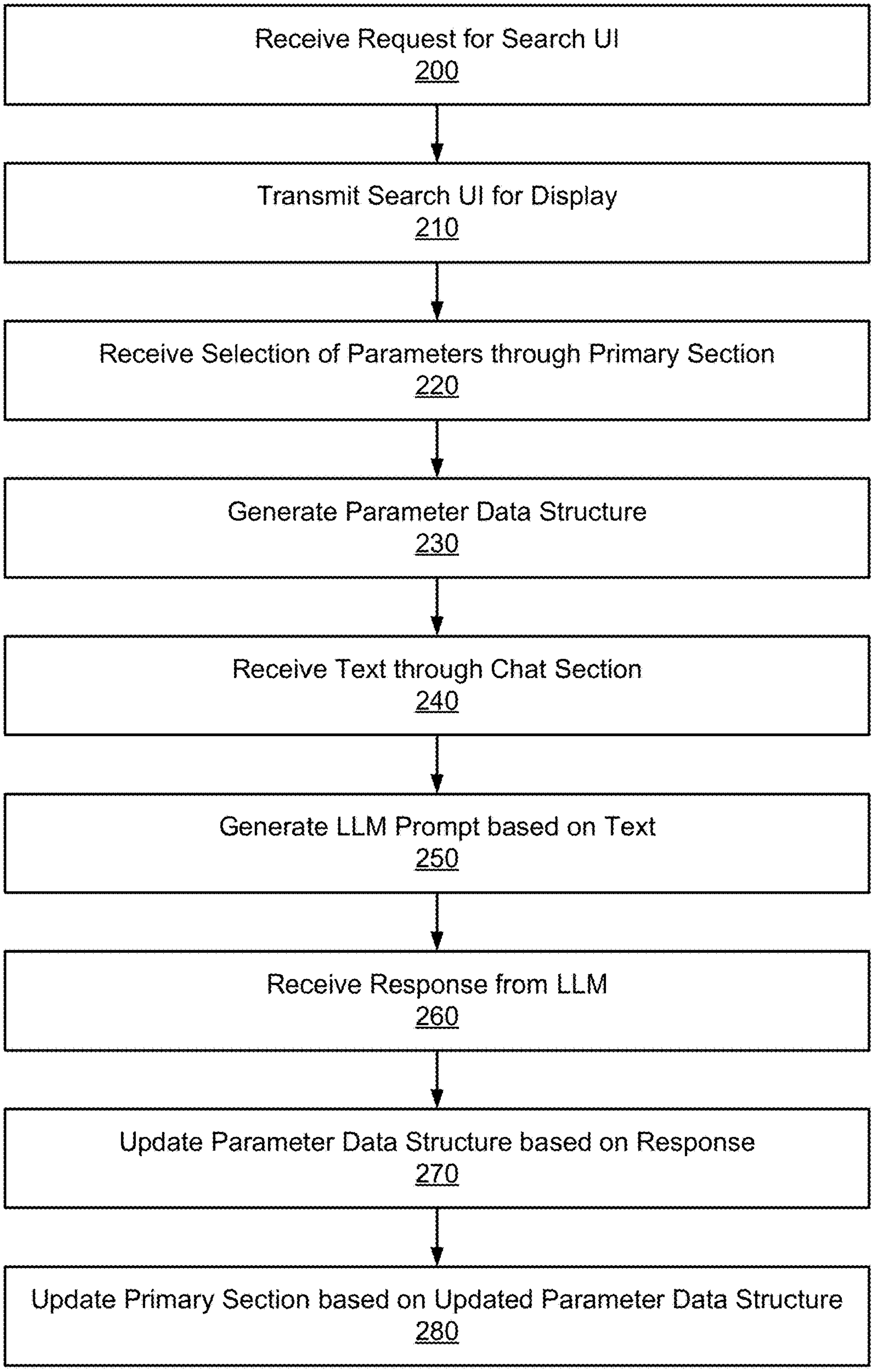
FIG. 2 is a flowchart for an example method for coordinating a primary section of a user interface with a chat section of that user interface, in accordance with some embodiments.

FIG. 2 is a flowchart for an example method for using a data structure to coordinate a primary section of a user interface with a chat section of that user interface, in accordance with some embodiments. Alternative methods may include more, fewer, or different steps and the steps may be performed in a different order from that illustrated in FIG. 2. Furthermore, while the steps may primarily be described as performed by an online system (e.g., online system 130), some or all of the functionality described below may be performed by a user device (e.g., user device 100), an entity system (e.g., entity system 110), or a model serving system (e.g., model serving system 140).

The online system receives 200 a request from a user device for a search UI. A search UI is a user interface that a user may use to search for content through the online system. For example, the search UI may be a user interface for searching for images made available by the online system or may a user interface for booking travel using the online system. The search UI may be a user interface that is displayable through a web browser or through a client application for the online operating on the user device.

The search UI includes two sections: a primary section and a chat section. The primary section is a section of the search UI through which the user can view and interact with content that the user is selecting. For example, in the image search example, the primary section of the search UI is the section of the search UI through which the user can view images as part of the user's search. The primary section also includes user interface elements that allow the user to set parameters for the search. For example, the primary section may include elements for filtering content to be displayed to the user (e.g., setting minimum or maximum values for certain parameters) or may include an element for providing a search query to the online system for searching for content.

The chat section of the search UI is a section of the search UI through which the user can engage in a chat session with an automated chat system or "chatbot". This chatbot can answer questions that the user inputs through the search section or request information from the user to assist with the user's search for content through the online system. For example, the chatbot may use a large-language model (LLM) to respond to messages from the user. In some embodiments, the chatbot may respond to messages from the user using data from a database of the online system or may use data from third-party databases (e.g., from databases operated by an entity system 110).

The online system transmits 210 the search UI to the user device for display to the user. The user device may display the search UI to the user through a client application of the online system or through a web browser.

The online system receives 220 a selection of search parameters through the primary section and generates 230 a parameter data structure based on received selection. A parameter data structure is a data structure that stores a set of parameters that have been currently selected by the user through the search UI. For example, the parameter data structure may store fields that corresponding to search parameters that the user has selected and may include values for each of those fields indicating a value of each selected parameter. The parameter data structure may store a range of values for a parameter (e.g., a range of sizes for images) or may store descriptors for content as parameters (e.g., content tags or topics).

The online system may update the primary section or the chat section of the search UI based on the generated data structure. For example, the online system may use the search parameters stored in the parameter data structure to search for content to present to the user. The online system also may update the primary section to depict content that meets the parameters selected by the user or may display a message from the chatbot in the chat section describing the parameters and values in the parameter data structure. In some embodiments, the online system updates the search UI every time the parameter data structure is updated.

The online system receives 240 parameters text from the user through the chat section of the search UI. The received parameters text is free text that is input by the user to the chat section and that describes parameters for the user's search. For example, the parameters text may include a free text description of the type of content that the user is searching for.

The online system generates 250 an LLM prompt based on the parameters text. The LLM prompt is a prompt to the LLM to extract parameters for the user's search from the parameters text. For example, the LLM prompt may include instructions for the LLM to identify parameters that the user may have specified in the parameters text and to identify values, if any, for those parameters that the user may have specified. The LLM prompt may further specify a format or structure for the parameters in the LLM's response. In some embodiments, the LLM prompt includes a description of which parameters a user may select for their search. For example, the LLM prompt may list the possible parameter fields for the parameter data structures and may list the possible values for those fields. In some embodiments, the LLM prompt also includes the parameter data structure.

The LLM prompt may also include instructions for the LLM to generate a response to the received parameters text. For example, the LLM prompt may include instructions that explain that the user is searching for content through the online system and instruct the LLM to generate a text response for a chat section of a search UI based on the received parameters text. The LLM prompt may include the chat history in the chat section or may include the parameters data structure.

The online system receives 260 a response from the LLM that includes a set of parameters extracted from the parameters text from the user. The online system extracts the parameters from the received response. In some embodiments, the online system parses the response from the LLM based on a format or structure specified in the LLM prompt to extract the parameters from the LLM response. Additionally, if the response includes text to include as a response to the received parameters text, the online system extracts the text from the LLM's response and updates the chat section to include the text.

The online system updates 270 the parameter data structure based on the set of parameters in the response. For example, the online system may add values for parameters, change the values for parameters, or remove values for parameters in the parameter data structure based on the set of parameters received from the LLM in response to the LLM prompt.

The online system updates 280 the primary section of the search UI based on the updated parameter data structure. For example, the online system may use the updated parameter data structure to select new content to present to the user. In some embodiments, the online system updates the primary section of the search UI by changing a page displayed through the search UI. For example, the online system may use the search UI for an application workflow whereby the user conducts multiple searches or interacts with the online system multiple times to complete the workflow. In these embodiments, the online system may progress to a new stage in the workflow based on the parameters in the parameter data structure, and may update the primary section of the search UI to a new page based on the new stage of the workflow.

In some embodiments, the online system uses the LLM to evaluate the content displayed in the primary section and may generate scores to identify which content may be most relevant to the user. For example, the LLM prompt may include user data describing the user using the search UI and may include content data describing the content that may be presented to the user. The LLM prompt may include instructions to generate scores for the content based on the user data and the content data, and the online system may use the generated scores to select which content to present to the user in the primary section. In some embodiments, the online system uses the generates scores to identify an item of content to highlight to the user. For example, if a score generated by the LLM exceeds a threshold, the online system may adjust the UI element for the corresponding content to highlight its relevance to the user. In some embodiments, the online system also prompts the LLM to generate an explanation for why the content is particularly relevant to the user.

Figure 3A:
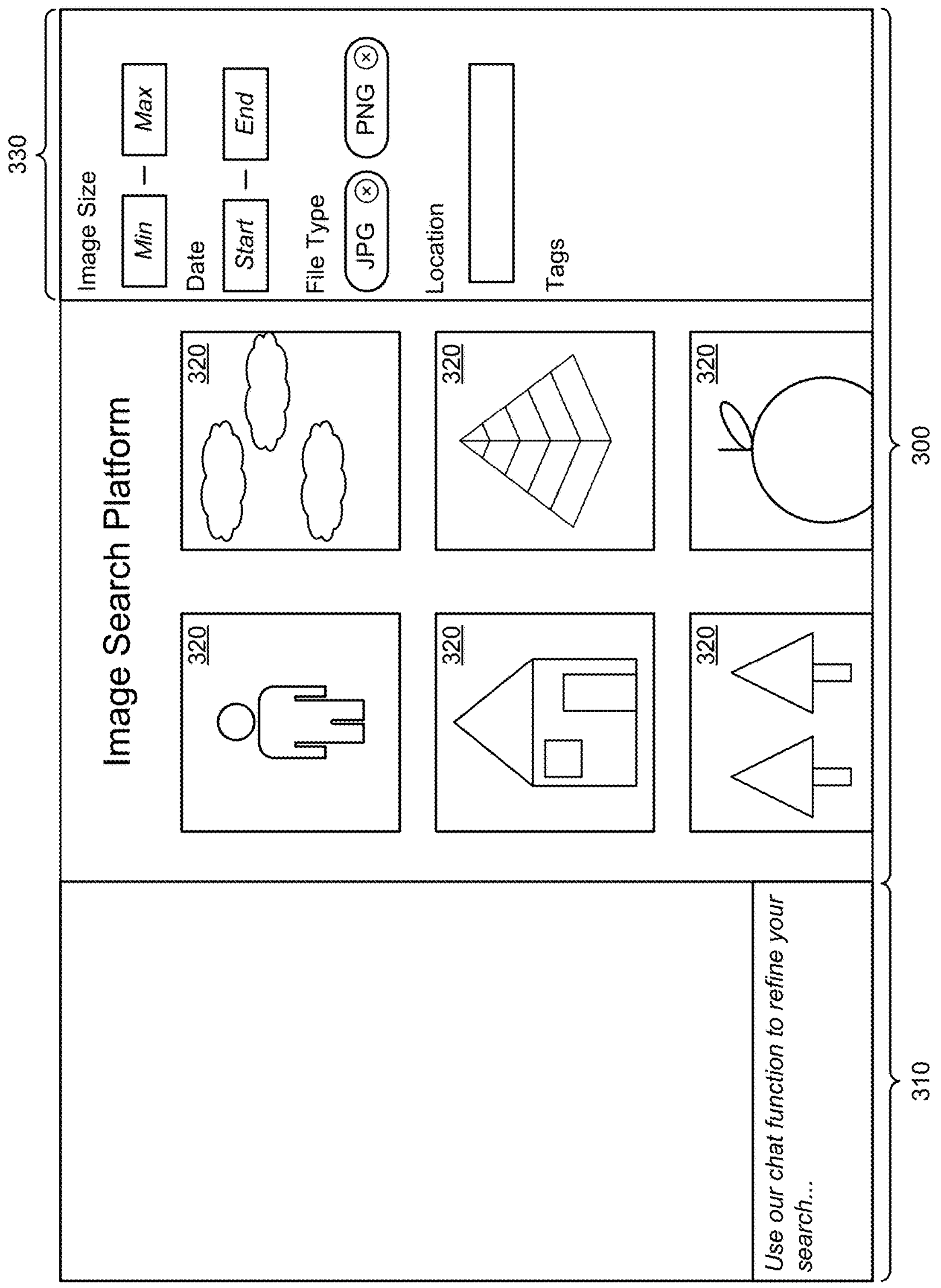
FIGS. 3A-3C illustrate example search user interfaces, in accordance with some embodiments.
Figure 3B:
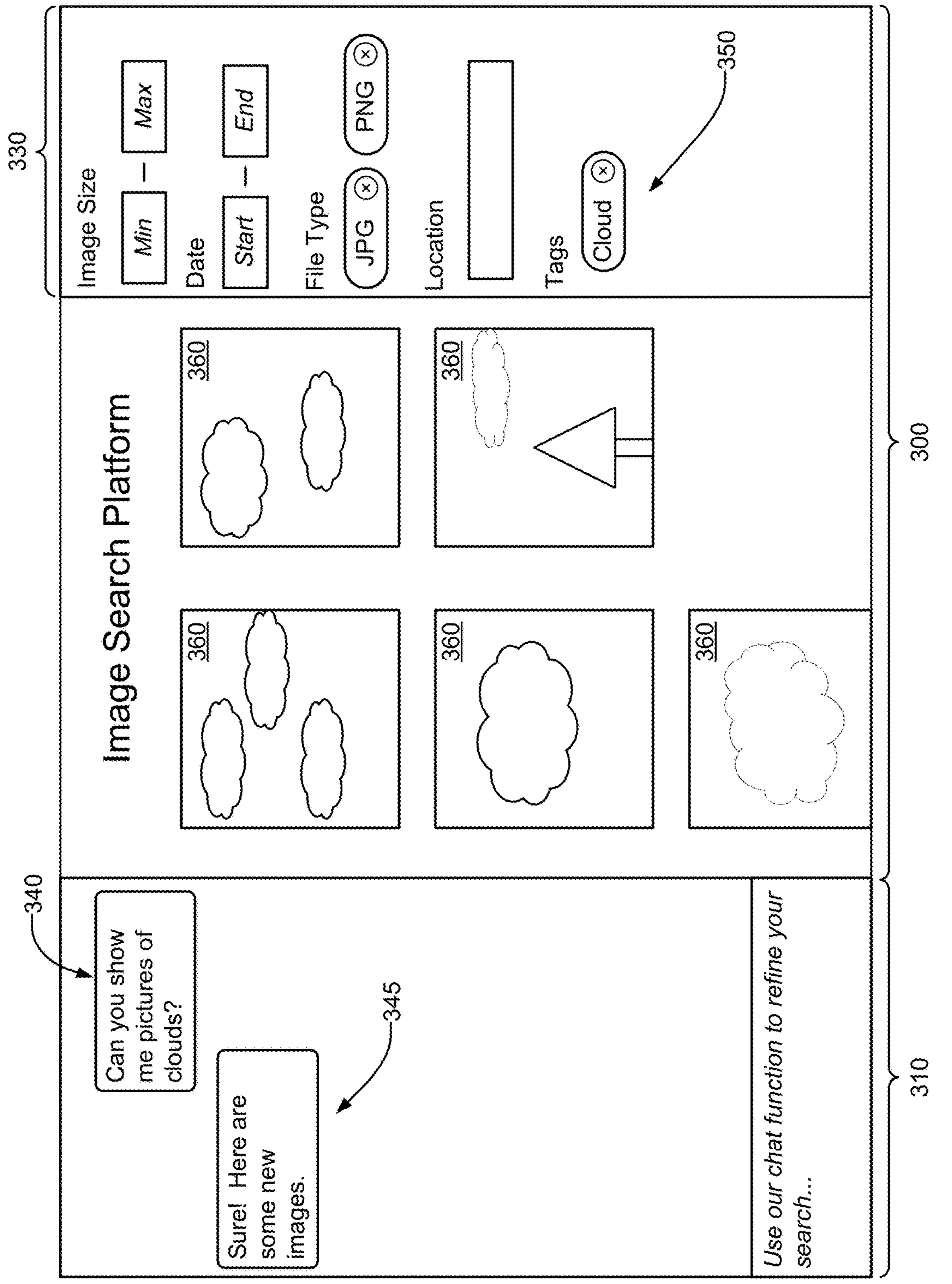
Figure 3C:
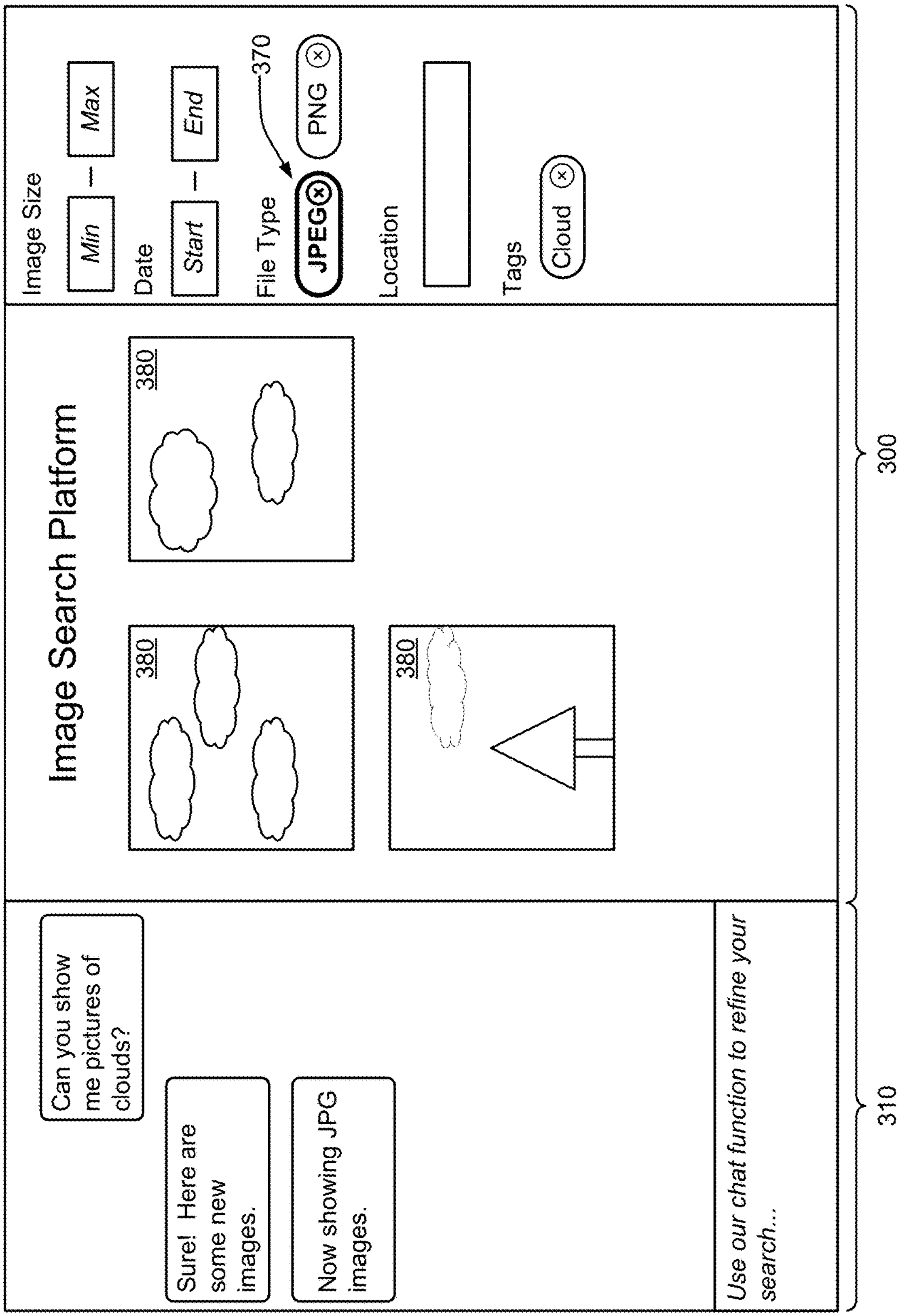

FIGS. 3A-3C illustrate example search UIs, in accordance with some embodiments. The illustrated embodiments generally relate to an image search platform whereby a user can search for images. However, alternative embodiments may use a search UI in other contexts. For example, the search UI may be used by a travel coordination system to coordinate travel bookings for a user.

In FIG. 3A, the search UI includes a primary section 300 and a chat section 310. The primary section 300 includes the content 320 that the user is searching for or interacting with. The primary section 300 also includes UI elements 330 that the user can interact with to set certain parameters for the content. For example, the user can set a range of image sizes, a date when the images were captured or posted, a type of image file type, a location where the image was captured, or tags defining content in the images.

In FIG. 3B, the user has entered text 340 to the chat section relating to the content that the user is searching for. As described above, the online system generates an LLM prompt based on the received text 340 to extract parameters for searching for content based on the received text. The online system maintains a parameters data structure that represents the parameters for searching for content through the search UI, and the online updates the displayed content 360 to reflect the parameters in the parameters data structure. The online system also updates the UI elements 350 in the primary section to reflect the parameters extracted from the entered text 340. In some embodiments, the LLM prompt instructs the LLM to generate a text response 345 to the received text 340 and the online system includes that text response 345 in the chat section 310 of the search UI.

In FIG. 3C, the user has selected a parameter through a UI element 370 of the primary section 300. Specifically, the user has selected a UI element to filter images based on whether they are JPEG images. The online system updates the parameter data structure for the search UI based on the user's selection and updates the primary section 300 of the search UI to show content 380 that reflects the updated parameters. The online system also updates the search section 310 to include a message 390 that reflects the selected parameter.

While the description above may primarily relate to the image search context, the described search user interface may be used in other contexts. For example, the search user interface may be used for travel bookings, such as for hotels, flights, rental cars, or restaurants. In these contexts, the primary section of the search user interface may display a page for a user to enter parameters for their booking. For example, the primary section may include fields for a user to select dates for a flight or hotel or may include fields for filtering out types of flights or hotels. The primary section may display a sequence of pages according to an application workflow for selecting a booking. For example, for selecting a hotel, the primary section may first display a page where a user can set the dates for their stay at a hotel. Once the user has set the dates, the primary section may display another page whereby the user can select a hotel from a list of them. As noted above, this page may include an indication of which content item (here a hotel) is most likely to be of interest to the user. The primary section may then display another page whereby a user can select a room in their selected hotel and then another page whereby a user can provide information to provide consideration in exchange for the room.

The chat section can be used by the user to set parameters for the search for a booking, as described above. For example, the user can use the chat section to specify the dates for their hotel or flights in the chat section and the online system may use the process described above to update parameters in the parameter data structure based on the dates in the user's message. Where a booking process includes the primary section displaying multiple pages for different steps in a booking, the user may use the chat section to set parameters in the parameter data structure for each of the different pages. For example, using the hotel booking example, the user may specify dates for their stay in the chat section and the online system may update the primary section to include those dates. When the primary section changes to the next page in the workflow where the user can select a hotel, the user can use the chat section to describe which hotels they are most interested in. For example, the user may specify that they are looking for a hotel with a pool or that they want a hotel that is nearby restaurants. The online system updates the primary section of the search user interface to display hotels that meet the parameters extracted from the user's requests through the chat section.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:

receiving a request for a search user interface from a user device;

transmitting a search user interface to the user device for display to the user, wherein the search user interface comprises a primary section and a chat section, wherein the primary section comprises a first subsection and a second subsection, wherein the first subsection is a subsection for displaying content relating to a search of the user and the second subsection comprises parameter elements for selecting a set of parameters for the search, and wherein the chat section comprises elements for a chat interface with an automated chat system;

receiving a selection of a set of parameters through the parameter elements of the second subsection of the primary section;

generating a parameters data structure based on the selected set of parameters, wherein the parameters data structure is a data structure that stores values for the set of parameters that have been selected by the user through the parameter elements of the second subsection of the primary section;

updating the first subsection of the primary section to display content based on the selected set of parameters;

receiving text from the user through the chat section of the search user interface;

generating a large language model prompt based on received text, wherein the large language model prompt comprises instructions to generate a chat response to the received text and to generate an updated set of parameters based on the received text, wherein the large language model prompt further comprises instructions to generate a score for an item of content based on user data associated with the user and content data associated with the item of content, and wherein the large language model prompt further comprises instructions to generate text explaining why the item of content is relevant to the user in response to the score for the item of content exceeding a threshold;

receiving a response from the large language model, wherein the received response comprises a text for a chat response to the received text and an updated set of parameters from the large language model;

updating the parameters data structure based on the updated set of parameters;

updating the chat section to include the text for a chat response to the received text;

updating the first subsection of the primary section to display content based on the updated set of parameters; and updating the parameter elements of the second subsection of the primary section based on the updated set of parameters from the response from the large language model.

2. The method of claim 1, wherein receiving the selection of the set of parameters comprises:

receiving a value for each of the set of parameters.

3. The method of claim 2, wherein receiving the selection of the set of parameters comprises:

receiving a range of values for a parameter of the set of parameters.

4. The method of claim 2, wherein receiving the selection of the set of parameters comprises:

receiving a descriptor for content.

5. The method of claim 1, wherein the large language model prompt further comprises the generated parameters data structure.

6. The method of claim 1, wherein the large language model prompt further comprises instructions to generate the updated set of parameters according to a particular structure.

7. A non-transitory computer-readable medium storing instructions that, when executed by a processor, cause the processor to perform operations comprising:

receiving a request for a search user interface from a user device;

transmitting a search user interface to the user device for display to the user, wherein the search user interface comprises a primary section and a chat section, wherein the primary section comprises a first subsection and a second subsection, wherein the first subsection is a subsection for displaying content relating to a search of the user and the second subsection comprises parameter elements for selecting a set of parameters for the search, and wherein the chat section comprises elements for a chat interface with an automated chat system;

receiving a selection of a set of parameters through the parameter elements of the second subsection of the primary section;

generating a parameters data structure based on the selected set of parameters, wherein the parameters data structure is a data structure that stores values for the set of parameters that have been selected by the user through the parameter elements of the second subsection of the primary section;

updating the first subsection of the primary section to display content based on the selected set of parameters;

receiving text from the user through the chat section of the search user interface;

generating a large language model prompt based on received text, wherein the large language model prompt comprises instructions to generate a chat response to the received text and to generate an updated set of parameters based on the received text, wherein the large language model prompt further comprises instructions to generate a score for an item of content based on user data associated with the user and content data associated with the item of content, and wherein the large language model prompt further comprises instructions to generate text explaining why the item of content is relevant to the user in response to the score for the item of content exceeding a threshold;

receiving a response from the large language model, wherein the received response comprises a text for a chat response to the received text and an updated set of parameters from the large language model;

updating the parameters data structure based on the updated set of parameters;

updating the chat section to include the text for a chat response to the received text;

updating the first subsection of the primary section to display content based on the updated set of parameters; and updating the parameter elements of the second subsection of the primary section based on the updated set of parameters from the response from the large language model.

8. The non-transitory computer-readable medium of claim 7, wherein receiving the selection of the set of parameters comprises:

receiving a value for each of the set of parameters.

9. The non-transitory computer-readable medium of claim 8, wherein receiving the selection of the set of parameters comprises:

receiving a range of values for a parameter of the set of parameters.

10. The non-transitory computer-readable medium of claim 8, wherein receiving the selection of the set of parameters comprises:

receiving a descriptor for content.

11. The non-transitory computer-readable medium of claim 7, wherein the large language model prompt further comprises the generated parameters data structure.

12. The non-transitory computer-readable medium of claim 7, wherein the large language model prompt further comprises instructions to generate the updated set of parameters according to a particular structure.

13. The method of claim 1, wherein receiving a selection of a set of parameters through the parameter elements of the second subsection of the primary section further comprises:

updating the chat section to include a message that reflects the selected parameter.

14. The method of claim 1, wherein the primary section displays a plurality of pages corresponding to a plurality of stages of an application workflow, and wherein the chat section is configured to receive text from the user that sets parameters in the parameters data structure for each of the plurality of pages, such that the primary section is updated to display content based on the parameters set through the chat section for a current page of the application workflow.

15. The method of claim 1, wherein the large language model prompt further comprises instructions to adjust a user interface element for an item of content to highlight its relevance to the user in response to the score for the item of content exceeding a threshold.

16. The method of claim 1, wherein the large language model prompt further comprises a description of available parameter fields for the parameters data structure and possible values for each of the available parameter fields.

* * * * *